United States Patent

Harada et al.

[11] Patent Number: 6,139,472
[45] Date of Patent: Oct. 31, 2000

[54] LOCKUP CONTROL SYSTEM FOR AUTOMATIC TRANSMISSION

[75] Inventors: Chiaki Harada; Satoshi Sakakibara; Akihiro Ueki, all of Kanagawa, Japan

[73] Assignee: Nissan Motor Co., Ltd., Yokohama, Japan

[21] Appl. No.: 09/348,471

[22] Filed: Jul. 7, 1999

[30] Foreign Application Priority Data

Jul. 14, 1998 [JP] Japan .................................. 10-198439

[51] Int. Cl.$^7$ .................................................. F16H 61/14
[52] U.S. Cl. .......................... 477/169; 477/175; 477/176
[58] Field of Search .................................... 477/169, 170, 477/174, 175, 176, 180

[56] References Cited

U.S. PATENT DOCUMENTS

| | | | |
|---|---|---|---|
| 5,616,099 | 4/1997 | Sakai .................................. | 477/169 |
| 5,616,100 | 4/1997 | Sakai et al. .......................... | 477/169 |
| 5,667,458 | 9/1997 | Narita et al. ......................... | 477/169 |
| 5,916,293 | 6/1999 | Katakura et al. ................. | 477/169 X |
| 5,935,043 | 8/1999 | Watanabe et al. .................. | 477/169 |
| 5,947,865 | 9/1999 | Watanabe et al. .................. | 477/169 |

FOREIGN PATENT DOCUMENTS

| | | |
|---|---|---|
| 61-99763 | 5/1986 | Japan . |
| 10-299886 | 11/1998 | Japan . |
| 10-299887 | 11/1998 | Japan . |

*Primary Examiner*—Sherry Estremsky
*Attorney, Agent, or Firm*—Foley & Lardner

[57] ABSTRACT

A lockup control system controls a lockup state of the automatic transmission employing a torque converter with a lockup clutch. The lockup control system executes a lockup clutch engagement pressure control for decreasing an engagement differential pressure of the lockup clutch at a predetermined differential pressure for a predetermined time period under a coast lockup state. Further, the lockup control system executes a learning control for obtaining the predetermined differential pressure by adding a differential pressure correction value to a differential pressure learning value by which the torque converter generates a slight slip under the coast lockup state. Therefore, even during the coast lockup state, both of suppressing vibrations by a lowering of a lockup capacity and maintaining a responsibility for re-increasing the differential pressure are ensured.

13 Claims, 8 Drawing Sheets

FIG.8A  TVO
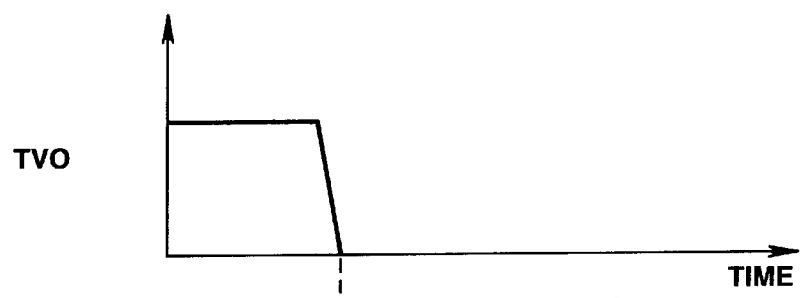
FIG.8B  $P_L = P_A - P_R$
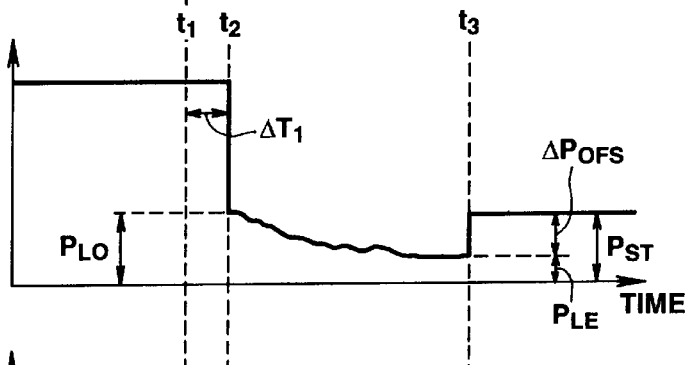
FIG.8C  $\Delta N = N_I - N_T$
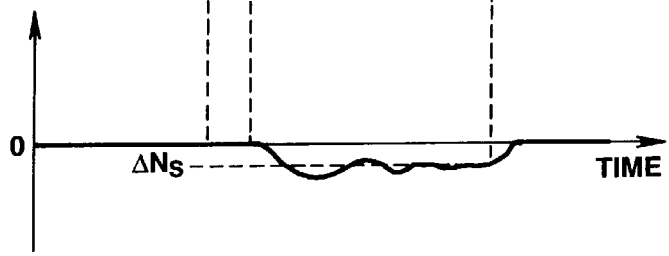

LOCKUP CONTROL SYSTEM FOR AUTOMATIC TRANSMISSION

BACKGROUND OF THE INVENTION

The present invention relates to a lockup control system for setting a torque converter installed between an internal combustion engine and an automatic transmission into a lockup condition and, more particularly, to a lockup control for suppressing vibrations during a coast lockup which is caused by releasing an acceleration pedal in a lockup range.

A torque converter installed in a transfer system of an automatic transmission is generally arranged to transmit a power from an input element to an output element through fluid. Therefore, the torque converter has a torque fluctuation absorbing function and a torque amplifying function, but degrades a transmission efficiency. In order to improve such transmission efficiency, a torque converter with a lockup clutch have been widely used since it is arranged to establish a direct connection between an engine and the automatic transmission when the vehicle is put in a lockup range where the torque fluctuation absorbing function and the torque amplifying function are not required.

If the lockup torque converter with the lockup clutch is put in a coast lockup range and only if an engine rotation speed or a vehicle speed is low, the lockup torque converter tends to generate undesired vibrations. More specifically, during the lockup proceeding process the engagement capacity of the lockup clutch tends to be excessively large due to the decrease of the engine power caused by releasing the acceleration pedal. This causes a radical engagement of the lockup clutch, thereby generating torque fluctuations and shocks. Further, in a lockup established condition, the decrease of the engine output due to the release of the acceleration pedal directly generates the shocks and vibrations due to torque fluctuation since the torque converter put in the lockup condition is not able to absorb such torque fluctuation.

A Japanese Patent Provisional Publication No. S61-99763 has proposed a system for improving the above-mentioned shocks and vibrations during the coast lockup.

SUMMARY OF THE INVENTION

The proposed system is arranged to decrease an engagement pressure of a lockup clutch to a predetermined value during the coast lockup. If the engagement pressure decreasing operation is adapted only for suppressing vibrations and shocks during the coast lockup, it may be decreased to a constant value. However, if the predetermined value for the engagement pressure is set too small, a re-increase of the engagement pressure of the lockup clutch takes an excessive time so as to degrade its responsibility. This degrades the operational ability and a fuel efficiency of a vehicle equipped with the automatic transmission. Therefore, it is necessary to set the predetermined value so as to satisfy both the suppression of vibrations and the operational ability of the lockup clutch. Further, since the value to be balanced is fluctuated by individual differences and aging of the lockup torque converter, it is difficult to satisfy both requirements by setting the engagement pressure at a certain value.

It is an object of the present invention to provide a lockup control system of an automatic transmission which system is arranged to highly ensure both the suppression of vibrations and shocks during the coast lockup and the responsibility during the re-increase of a lockup clutch engagement differential pressure.

A lockup control system according to the present invention is adapted to an automatic transmission which employs a torque converter with a lockup clutch and is connected to an internal combustion engine through the torque converter. The lockup control system comprises a controller which is arranged to decrease an engagement differential pressure of the lockup clutch at a predetermined differential pressure for a predetermined time period under a coast lockup state, which is caused by releasing an acceleration pedal of the engine in a lockup condition of the automatic transmission, to gradually increase the engagement differential pressure at a preset rate after the predetermined time period elapsed, and to obtain the predetermined differential pressure by adding a differential pressure correction value to a differential pressure learning value by which the torque converter generates a slight slip under the coast lockup state.

BRIEF DESCRIPTION OF THE DRAWINGS

FIGS. 8A, 8B and 8C are time charts explaining the control program of FIG. 7.

DETAILED DESCRIPTION OF THE INVENTION

Referring to FIGS. 1 to 8C, there is shown an embodiment of a lockup control system according to the present invention.

Figure 1:
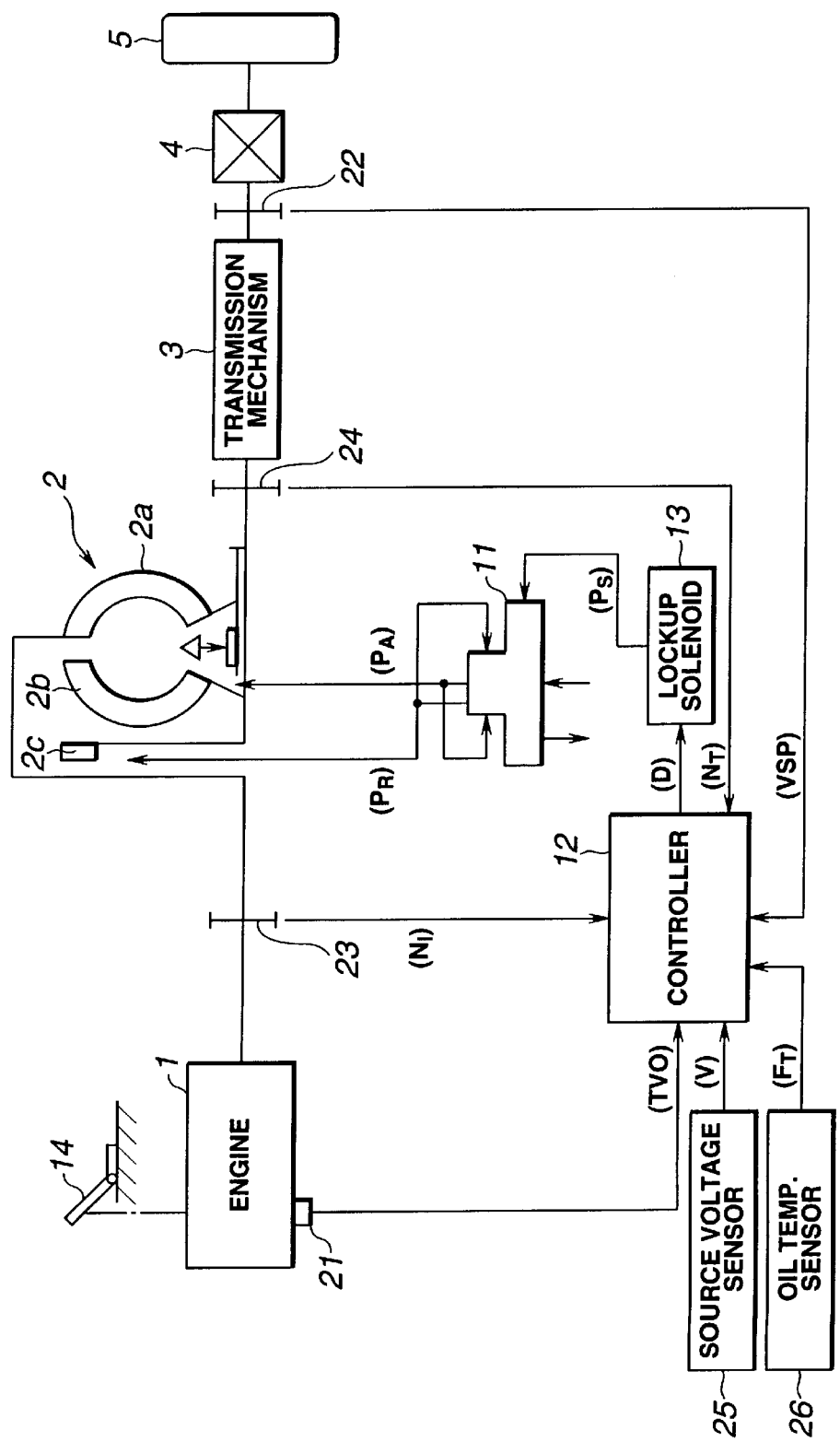
FIG. 1 is a schematic view showing a lockup control system adapted to an automatic transmission of a vehicular drive system in accordance with the present invention.

FIG. 1 shows a vehicular drive system employing the lockup control system according to the present invention. An internal combustion engine 12 is connected to a gear transmission mechanism 3 of an automatic transmission through a torque converter 2. Drive wheels 5 are connected to the gear transmission mechanism 3 through a differential gear system 4.

The internal combustion engine 1 is arranged to generate an output according to a depression degree of an acceleration pedal 14 which a drive depresses to vary the engine output. The torque converter 2 is of a lockup type which includes a pump impeller 2a functioning as an input element driven by the engine 1, a turbine runner 2b functioning as an output element connected to an input shaft of the gear transmission mechanism 3, and a lockup clutch 2c directly connecting the pump impeller 2a and the turbine runner 2b.

An engagement force of the lockup clutch 2c is decided by a differential pressure (lockup clutch engagement differential pressure) $P_L$ between an apply pressure $P_A$ and a release pressure $P_R$. When the apply pressure $P_A$ is smaller than the release pressure $P_R$, the lockup clutch 2c is released to cancel a direction connection between the pump impeller 2a and the turbine runner 2b and to maintain a converter condition where slippage of the torque converter 2 is allowed. When the apply pressure $P_A$ becomes greater than the release pressure $P_R$ and when the differential pressure therebetween is greater than a predetermined value, the lockup clutch 2c is engaged to forbid a relative rotation between the pump impeller 2a and the turbine runner 2b and to maintain a lockup condition of the torque converter 2.

Figure 2:
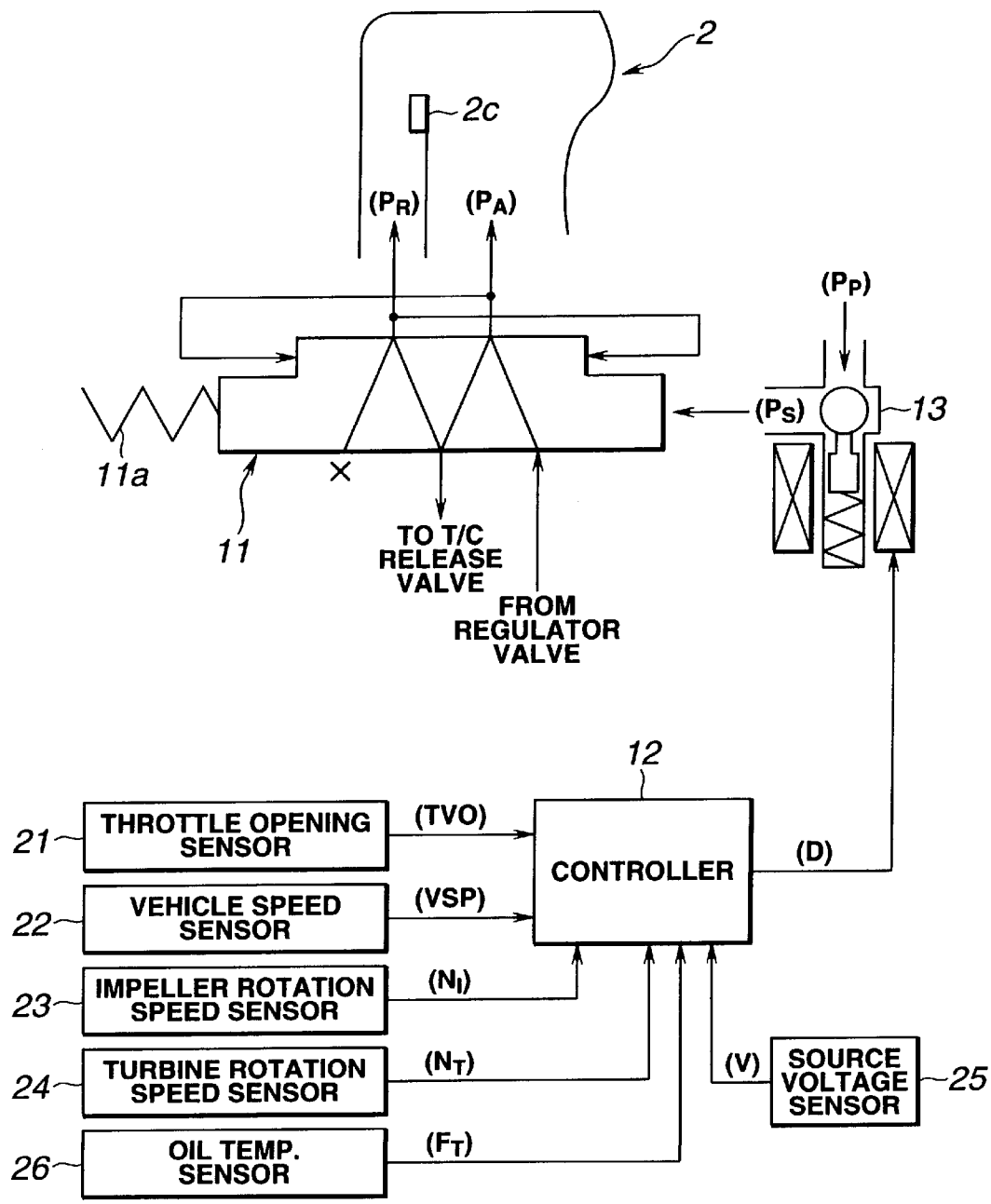
FIG. 2 is a schematic view showing the lockup control system of FIG. 1.

A lockup control system adapted to the torque converter 2 is arranged such that the apply pressure $P_A$ and the release pressure $P_R$ are decided to execute a predetermined lockup control. More specifically, a lockup control valve 11 of the lockup control system decides the apply pressure $P_A$ and the release pressure $P_R$ according to a signal pressure $P_S$ outputted from a lockup solenoid 13 duty controlled by a controller 12. As shown in FIG. 2, the lockup control valve 11 and the lockup solenoid 13 are of types which are commonly used. That is, the lockup solenoid 13 employs a constant pilot pressure $P_P$ as a base pressure and generates the signal pressure $P_S$ according to the lockup command (duty signal) D outputted from the controller 12.

Figure 3:
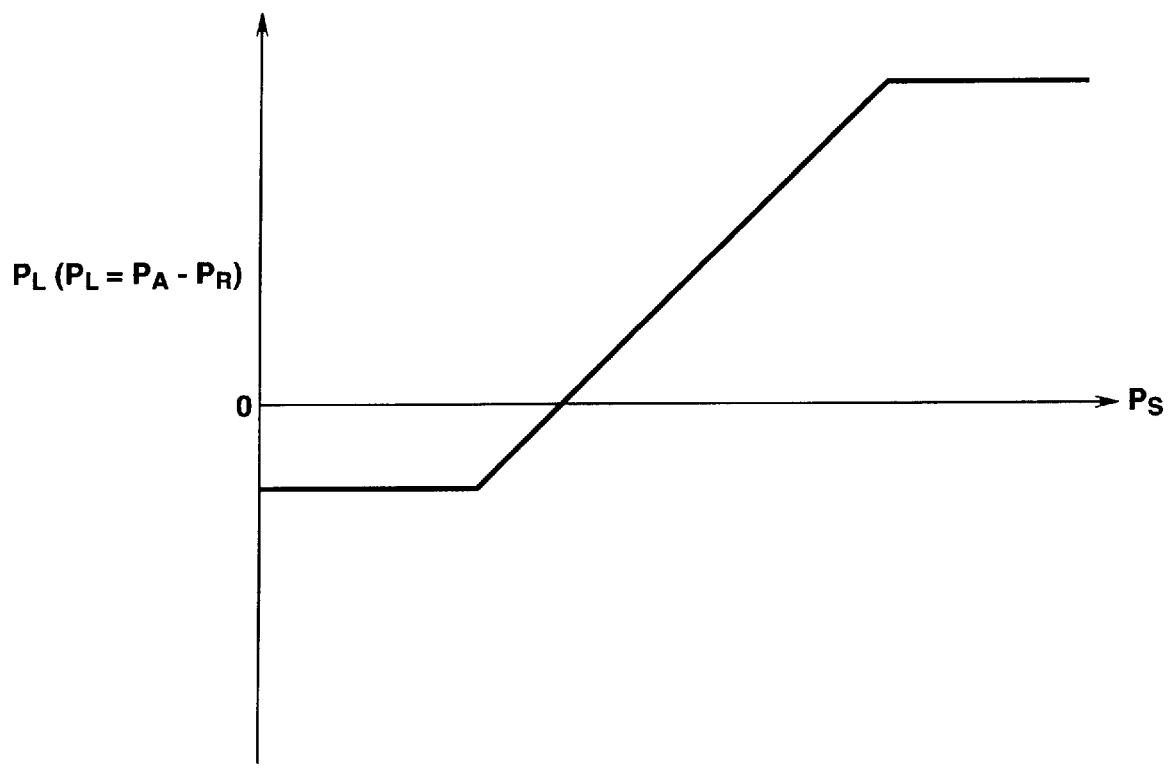
FIG. 3 is a graph showing a control characteristic of an engagement differential pressure of the lockup clutch of FIG. 2.

The signal pressure $P_S$ and the feedback release pressure $P_R$ are applied to one side of the lockup control valve 11, and a biasing force of a spring 11a and the feedback apply pressure $P_A$ are applied to the other side of the lockup control valve 11 as shown in FIG. 2. Therefore, when the signal pressure $P_S$ from the lockup solenoid 13 is increased according to the increase of the lockup command (duty signal) D, the lockup control valve 11 functions to increase the apply pressure $P_A$ with respect to the release pressure $P_R$ and to increase the differential pressure therebetween. That is, the lockup engagement differential pressure $P_L=(P_A-P_R)$ is increased as shown in FIG. 3 so as to enable the engagement of the lockup clutch 2c and to put the torque converter 2 into the lockup condition.

Further, when the signal pressure $P_S$ from the lockup solenoid 13 is decreased according to the decrease of the lockup command D (duty signal), the lockup control valve 11 functions to increase the release pressure $P_R$ with respect to the apply pressure $P_A$ so as to put the lockup clutch 2c into a released state. That is, the torque converter 2 is put into the converter condition.

The controller 12 is electrically connected to a throttle opening sensor 21, a vehicle speed sensor 22, an impeller rotation speed sensor 23, a turbine rotation speed sensor 24, a source voltage sensor 25 and an oil temperature sensor 26, as shown in FIGS. 1 and 2. The throttle opening sensor 21 detects a throttle opening TVO of the engine 1 and outputs a signal indicative of the throttle opening TVO to the controller 12. The vehicle speed sensor 22 detects a vehicle speed VSP and outputs a signal indicative of the vehicle speed VSP to the controller 12. The impeller rotation speed sensor 23 detects a rotation speed $N_I$ (corresponding to the engine rotation speed) of the pump impeller 2a and outputs a signal indicative of the impeller rotation speed $N_I$ to the controller 12. The turbine rotation speed sensor 24 detects a rotation speed $N_T$ of the turbine runner 2b and outputs a signal indicative of the turbine runner speed NT to the controller 12. The source voltage sensor 25 detects a source voltage V and outputs a signal indicative of the source voltage V to the controller 12. The oil temperature sensor 26 detects a working oil temperature $F_T$ and outputs a signal indicative of the oil temperature $F_T$ to the controller 12.

Figure 4:
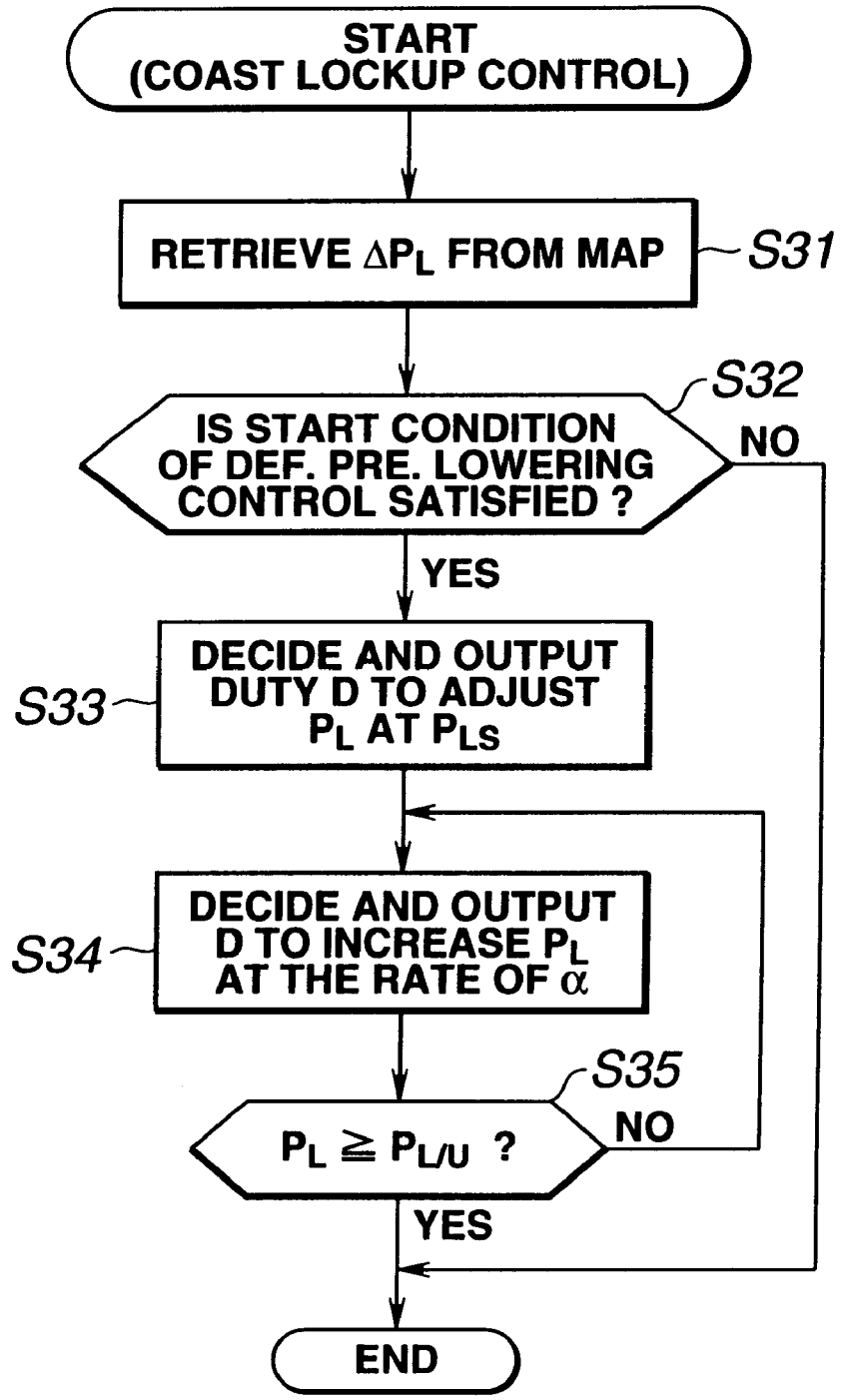
FIG. 4 is a flowchart showing a control program of the lockup clutch engagement differential pressure during a coast lockup.

The controller 12 executes a control program shown in FIG. 4 on the basis of the signals from the above-mentioned sensors. By the execution of this control program, the lockup control of the torque converter 2 during the coast lockup is carried out as shown by time charts of FIGS. 5A to 5D.

Figure 6:
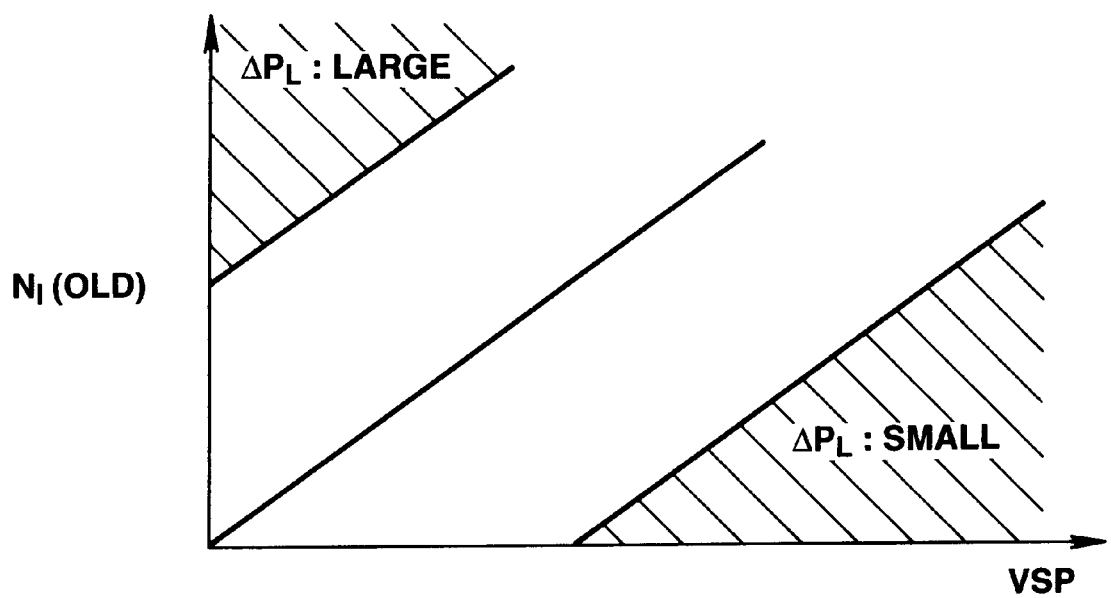
FIG. 6 is a graph showing a range map of the differential pressure correction value employed for obtaining a differential pressure learning value.

At a step S31, the controller 12 retrieves the differential pressure correction value $\Delta P_L$ from a map corresponding to the content of FIG. 6. The map for retrieving the differential pressure correction value $\Delta P_L$ has been previously stored in the controller 12.

At a step S32, the controller 12 decides whether or not a start condition for starting a differential pressure decreasing control is satisfied. The differential pressure decreasing control is executed to suppress wobbling vibrations caused during the coast lockup. The start condition includes a time when a coast lockup condition is established by releasing the acceleration pedal 14 from a largely depressed state in the lockup range. When the controller 12 decides that the start condition is not satisfied, the wobbling vibrations does not generate. Therefore, when the decision at the step S32 is negative, the differential pressure decreasing control is not executed, that is, the routine jumps to an end block to terminate this program. When the decision at the step S32 is affirmative, the routine proceeds to a step S33.

At the step S33, the controller 12 decides the duty signal D so as to set the lockup engagement differential pressure $P_L=(P_A-P_R)$ at a predetermined differential pressure $P_{LS}$ for preventing the vibrations, in order to ensure the operation during a time period $\Delta T$ from a moment $t_1$ to a moment $t_2$ in FIGS. 5A to 5D. Further, the controller 12 outputs the decided duty signal D to the lockup solenoid 13. The predetermined differential pressure $P_{LS}$ is the sum of a differential pressure learning value $P_{LE}$ under which the torque converter 2 generates a slight slip and the differential correction value $\Delta P_L$ obtained at the step S31 ($P_{LS}=P_{LE}+\Delta P_L$). Therefore, the predetermined differential pressure $P_{LS}$ takes the smallest value by Which the torque converter 2 does not generate slippage.

The proper differential pressure (differential pressure lowering value) $P_{LS}$ is varied according to the vehicle speed $V_{SP}$ and the engine rotation speed $N_I$ at a time just before the differential pressure decreasing control, the oil temperature $F_T$ and the source voltage V. Therefore, if the predetermined differential value $P_{LS}$ for preventing the wobbling vibrations is simply decided by adding a predetermined value to the differential pressure learning value $P_{LE}$, the simply decided differential pressure decreasing value will function to be unable to prevent the wobbling vibrations due to the excessive higher-setting of the value and to degrade the responsibility of the re-increase thereof due to the excessive lower-setting thereof.

Therefore, the differential pressure correction value $\Delta P_L$ is variably set so as to correct shortage and excess of the differential pressure decreasing value. More specifically, the differential pressure correction value $\Delta P_L$ is set at a relatively small value when the vehicle is running at high speed as shown by a lower right area in FIG. 6, and it is set at a relatively large value when the engine rotation speed $N_I$ is high as shown by an upper left area in FIG. 6. The controller 12 has previously stored the map of FIG. 6 so as to decide the differential pressure correction value $\Delta P_L$ according to the engine rotation speed VSP and the engine rotation speed $N_I$ at the time just before the differential pressure control starts.

The reason for decreasing the predetermined differential pressure $P_{LS}$ by setting the differential pressure correction value $\Delta P_L$ at a small value is owing to the following reasons:

That is, in the high vehicle speed range, the torque converter 2 usually transmits the power at a high speed ratio (small torque ratio) if the lockup clutch 2c is released. Therefore, the change of the engine rotation speed due to the coasting (foot releasing) almost does not affect the inertia torque. Further, even if the predetermined differential pressure $P_{LS}$ (differential pressure lowering value) is lowered, the slipping amount of the torque converter 2 is kept within a range so as not to become excessively large.

The reason for increasing the predetermined differential pressure $P_{LS}$ by setting the differential pressure correction value $\Delta P_L$ at a large value is owing to the following reasons:

That is, in the high engine rotation speed range, the torque converter 2 usually transmits the power at a low speed ratio (large torque ratio) if the lockup clutch 2c is released. Therefore, the change of the engine rotation speed due to the coasting (foot releasing) largely affects the inertia torque. Further, if the predetermined differential pressure $P_{LS}$ (differential pressure lowering value) is lowered, the slipping amount of the torque converter 2 becomes excessively large and therefore the re-increase of the differential pressure tends to delay.

Further, if the fluctuation (dispersion) of the oil temperature $F_T$ and/or the source voltage V fluctuates the commanded differential pressure. Therefore, the differential pressure correction value $\Delta P_L$ is corrected according to the oil temperature $F_T$ and the source voltage V.

The predetermined time period $\Delta T$ for keeping (maintaining) the lockup clutch engagement differential pressure $P_L = (P_A - P_R)$ at the vibration preventing differential pressure $P_{LS}$ is set at a time period which is necessary to stabilize the engine output and the engine rotation speed. The predetermined time period $\Delta T$ has been previously obtained through experiments so as to satisfy both the drivability of the vehicle and the suppression of shocks during the coast lockup.

At a step S34, the controller 12 increases the duty signal D so as to gradually increase the lockup clutch engagement differential pressure $P_L = (P_A - P_R)$ at a rate of a time changing rate a determined according to the throttle opening TVO representative of the engine load and outputs the duty to the lockup solenoid 13.

At a step S35, the controller 12 decides whether or not the lockup clutch engagement differential pressure $P_L$ is greater than or equal to the a lockup capacity corresponding value $P_{L/U}$ by which the lockup clutch 2c is fully engaged. The lockup capacity corresponding value takes a value shown in FIG. 5B. When the decision at the step S35 is affirmative, the routine proceeds to the end block to terminate this control program. When the decision at the step S35 is negative, the routine returns to the step S34. That is, the gradual increase of the differential pressure $P_L$ is continued until the differential pressure $P_L$ becomes greater than or equal to the lockup capacity corresponding value $P_{L/U}$, as shown lo in FIG. 5B.

Figure 7:
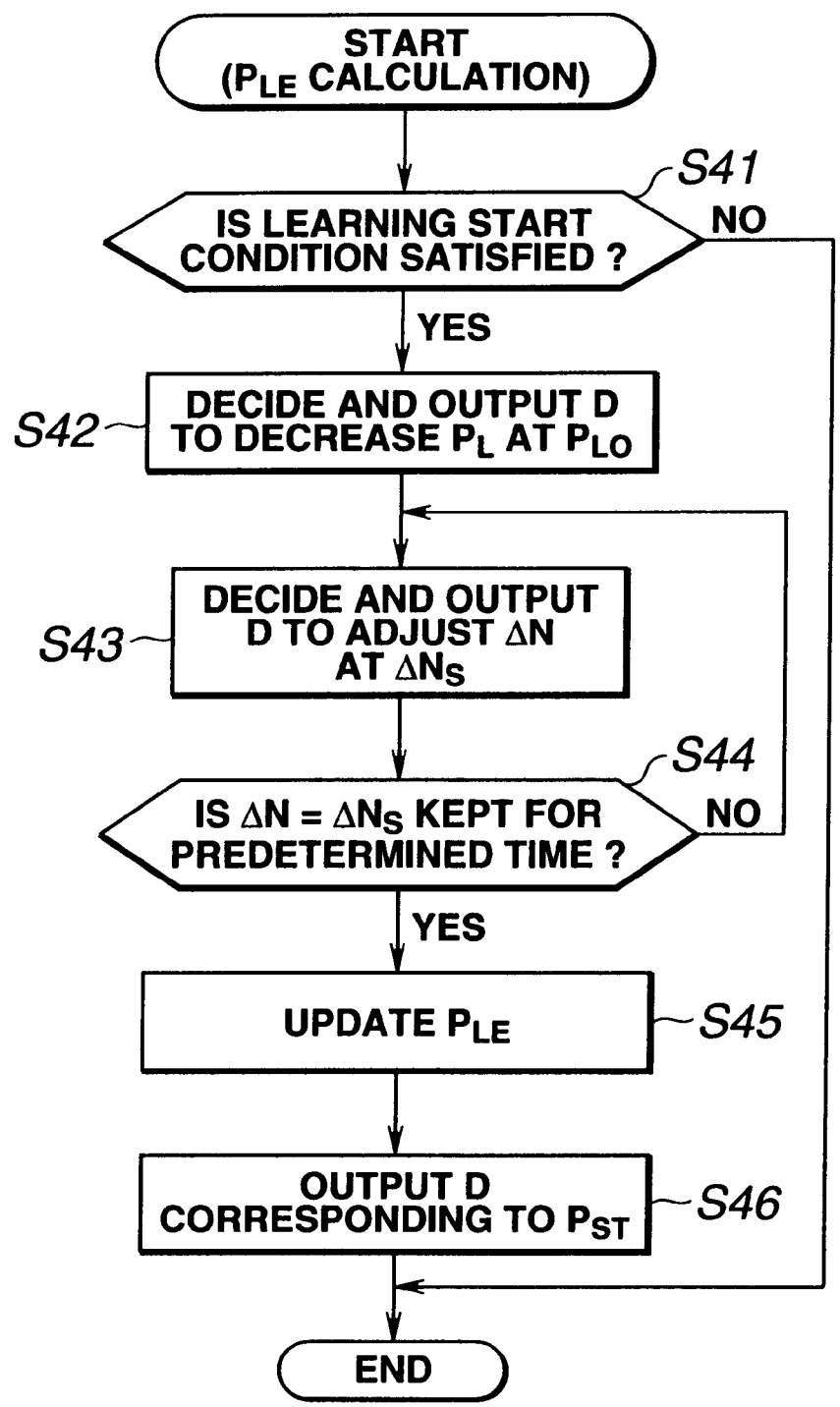
FIG. 7 is a flowchart showing a learning control program for obtaining the differential pressure learning value.

The differential pressure learning value $P_{LE}$ mentioned in the explanation of the step S33 is obtained by the execution of a calculation program shown in FIG. 7.

At a step S41, the controller 12 decides whether a condition for starting the learning as to the differential pressure learning value $P_{LE}$ is satisfied or not. The learning start condition is defined on the basis of whether or not it is a range where an engine stall will be generated if the radical braking is carried out. More specifically, when all of the following three conditions are satisfied, the controller 12 decides that the learning starting condition is satisfied.

(1) A predetermined time period $\Delta T_1$ has elapsed from the coast lockup.

(2) The engine rotation speed $N_I$ is smaller than or equal to a predetermined value indicative of a low engine rotation speed range.

(3) The vehicle speed VSP is smaller than a preset value indicative of a low vehicle speed range.

When the decision at the step S41 is affirmative, the routine proceeds to a step S42 to start the calculation of the differential pressure learning value $P_{LE}$. That is, at a moment t2 when the predetermined time period $\Delta T_1$ elapsed from the coast lockup moment $t_1$ as shown in FIGS. 8A to 8C, the step S42 is executed. More specifically, at the step S42, the controller 12 decides the duty signal D so as to decrease the differential pressure $P_L$ to an initial pressure $P_{L0}$ which is the sum of the previous differential pressure learning value $P_{LE}(OLD)$ and an offset differential pressure $\Delta P_{OFS}$. Further, the controller 12 outputs the decided duty signal D to the lockup solenoid 12.

At a step S43, the controller 12 decides the duty signal D so as to adjust the torque converter slipping amount $\Delta N$ at a predetermined slipping amount $\Delta N_S$ for determining the slip start shown in FIG. 8C. Further, the controller 12 outputs the decided duty signal D to the lockup control solenoid 13.

At a step S44, the controller 12 decides whether or not the torque converter slipping amount $\Delta N$ is kept at the slip start determining predetermined slipping amount $\Delta N_s$ for at least the predetermined time $\Delta T$. When the decision at the step S44 is affirmative, the routine proceeds to a step S45. When the decision at the step S44 is negative, the routine returns to the step S43. That is, the step S43 is repeated until the decision at the step S44 becomes affirmative.

At the step S45 following to the affirmative decision at the step S44, the controller 12 updates the differential pressure learning value $P_{LE}$, that is, the differential pressure $P_L$ at the moment t3 of FIG. 8B is employed as the differential pressure learning value $P_{LE}$. The updated differential pressure learning value $P_{LE}$ is used in the differential pressure decreasing control shown in FIG. 4.

At the step S46, the controller 12 obtains a limit differential pressure $P_{ST}$ by adding the offset differential pressure $\Delta P_{OFS}$ to the differential pressure learning value $P_{LE}$. The limit differential pressure $P_{ST}$ is a lower limit value by which the torque converter 2 does not generate a slip. Further, the controller 12 outputs the duty signal D corresponding to the limit differential pressure $P_{ST}$ to the lockup solenoid 13.

Figure 5A:
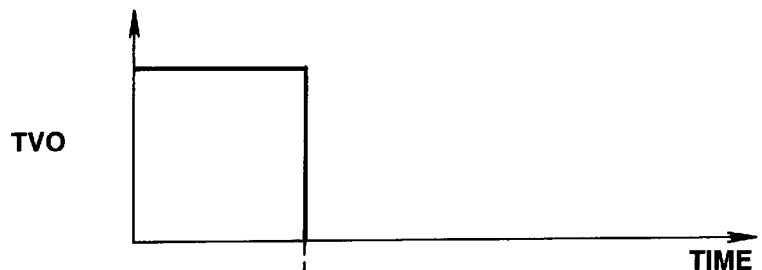
FIGS. 5A, 5B, 5C and 5D are time charts showing operation of the lockup clutch engagement differential pressure.
Figure 5B:
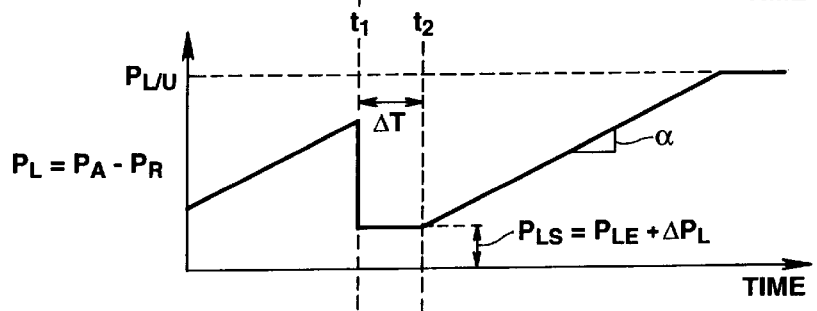

With the thus arranged embodiment according to the present invention, when in the lockup range the torque converter 2 is being put into the lockup condition by the operation of the lockup clutch 2c according to the lockup clutch engagement differential pressure $P_L$ or when the acceleration pedal 14 is released under the lockup condition of the torque converter 2, that is, when the coast lockup is established, the lockup clutch engagement differential pressure $P_L$ is decreased to the predetermined differential pressure $P_{LS}$ during the predetermined time $\Delta T$ shown in FIG. 5B, thereafter it is gradually increased at the rate of the time gradient a since the operating condition is within the lockup range.

Figure 5C:
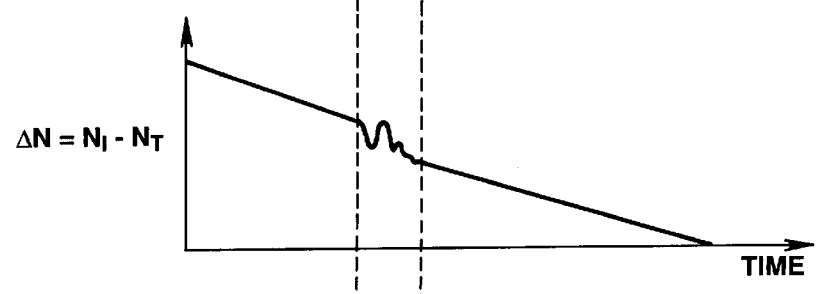
Figure 5D:
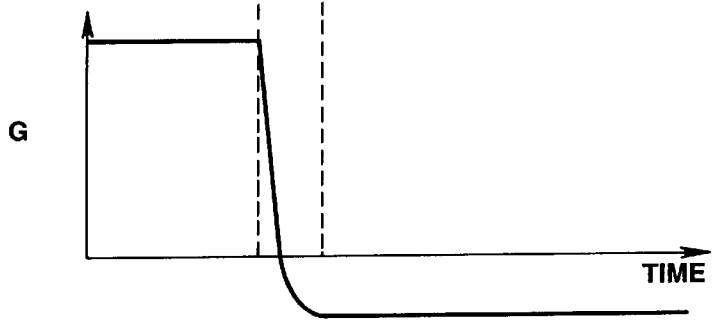

By decreasing the lockup clutch engagement differential pressure $P_L$ for the predetermined time $\Delta T$, the lockup clutch 2c is put in a slipable condition even in the lockup range, as is clear from the timeseries of the torque converter slipping amount $\Delta N$ shown in FIG. 5C. The slipable condition functions to absorb the torque fluctuation as is clear from the timeseries change of a vehicle acceleration G during the coast lockup, as shown in FIG. 5D. Therefore, the wobbling vibrations and shocks during the coast lockup are prevented thereby.

Further, with the thus arranged embodiment according to the present invention, the predetermined differential pressure $P_{LS}$, which functions as an aimed value for decreasing the lockup clutch engagement pressure $P_L$, is obtained by adding the differential pressure correction value $\Delta P_L$ to the differential pressure learning value $P_{LE}$ by which the torque converter generates a slight slip under the coast lockup condition. Therefore, it is possible to ensure both the suppression of vibrations and shocks and the responsibility of the change of the differential pressure during re-increase of the lockup clutch engagement differential pressure $P_L$.

Furthermore, the control, which the lockup clutch engagement differential pressure $P_L$ is decreased to the predetermined differential pressure $P_{LS}$ and is then increased at the rate of the gradient α, is executed only when the operating condition is changed from the lockup condition where the depressed amount of the acceleration pedal 14 is large to the coast lockup condition where the acceleration pedal 14 is released, as mentioned in the explanation of the step S41. Therefore, in case that the operating condition is changed from the lockup condition where the depression amount of the acceleration pedal 14 is small to the coast lockup condition, the decrease of the lockup clutch engagement differential pressure is not be executed. This functions to prevent the decrease and the gradual increase of the lockup engagement differential pressure $P_L$ from being uselessly executed.

Additionally, since the differential pressure correction value $\Delta P_L$ has been previously determined according to the vehicle speed and the engine rotation speed at the time just before the start of the differential pressure control, it is possible to ensure both the suppression of the vibrations and shocks and the responsibility of the change of the differential pressure $P_L$ even if the vehicle speed VSP and the engine rotation speed $N_I$ are varied.

Since the decrease keeping time period ΔT of the lockup clutch engagement differential pressure $P_L$ during the coast lockup has been previously determined so as to ensure both the vibrations and shocks preventing effect and the responsibility of the change of the differential pressure, the execution thereof are further firmly ensured.

Since the gradual increase rate a employed in the gradual increase control of the engagement differential pressure $P_L$ has been previously determined according to the throttle opening TVO indicative of the engine load condition, the re-increase of the lockup clutch engagement differential pressure $P_L$ is properly executed without generating the delay of the re-increase operation while suppressing the generation of the shocks.

Further, since the embodiment according to the present invention is arranged to execute the learning control where the engagement differential pressure $P_L$ is decreased until the slight slip $\Delta N_S$ is generated as shown in FIGS. 7 and 8A to 8C (corresponding to the step S43) only when the controller 12 decides that the engine rotation speed $N_I$ is smaller than the preset engine rotation speed indicative of the low rotation speed range, or when the controller 12 decides that the vehicle speed is smaller than the predetermined low speed value indicative of the low vehicle speed range. Further, the engagement differential pressure $P_L$ is adjusted at the sum $P_{ST}$ of the differential pressure learning value $P_{LE}$ and the slight offset differential pressure $\Delta P_{OFS}$ after the learning control is executed. This arrangement prevents the decrease of the lockup clutch engagement differential pressure $P_L$ from being excessively executed. Therefore, this functions to suppress the deterioration of the durability or the excessive heating of the lockup clutch due to frequent slips.

In the low engine rotation speed range or the low vehicle speed range, if the drive wheels 5 are put in a braking lock state caused by radical braking, the engine stall tends to be generated due to the lockup condition of the torque converter 2. Therefore, by keeping the lockup clutch engagement differential pressure $P_L$ at the sum $P_{ST}$ of the differential pressure learning value $P_{LE}$ and the slight offset differential pressure $\Delta P_{OFS}$, it becomes possible to rapidly execute a lockup releasing operation for preventing the engine stall.

The entire contents of Japanese Patent Application No. 10-198439 filed on Jul. 14, 1998 in Japan are incorporated herein by reference.

Although the invention has been described above by reference to a certain embodiment of the invention, the invention is not limited to the embodiment described above. Modifications and variations of the embodiment described above will occur to those skilled in the art, in light of the above teaching.

What is claimed is:

1. A lockup control system of an automatic transmission, the automatic transmission employing a torque converter with a lockup clutch and being connected to an internal combustion engine through the torque converter, said lockup control system comprising:

a controller arranged
to decrease an engagement differential pressure of the lockup clutch at a predetermined differential pressure for a predetermined time period under a coast lockup state, which is caused by releasing an acceleration pedal of the engine in a lockup condition of the automatic transmission,
to gradually increase the engagement differential pressure at a preset rate after the predetermined time period elapsed, and
to obtain the predetermined differential pressure by adding a differential pressure correction value to a differential pressure learning value by which the torque converter generates a predetermined amount of slip under the coast lockup state.

2. The lockup control system as claimed in claim 1, wherein said controller executes decreasing the engagement differential pressure at the predetermined differential pressure and increasing the decreased engagement differential pressure only when an operating condition of the automatic transmission is changed from a lockup condition in which a depression amount of the acceleration pedal is larger than a predetermined value to the coast lockup state.

3. The lockup control system as claimed in claim 1, wherein the differential pressure correction value has been previously determined according to each combination of a vehicle speed and an engine rotation speed at a time just before the decreasing and increasing of the lockup engagement differential pressure is started.

4. The lockup control system as claimed in claim 1, wherein the predetermined time period has been previously determined so as to ensure both suppressing shocks during the coast lockup state and a responsibility of increasing the engagement differential pressure after it is decreased.

5. The lockup control system as claimed in claim 1, wherein the preset rate employed for increasing the decreased engagement differential pressure has been previously determined according to a load condition of the engine.

6. The lockup control system as claimed in claim 1, wherein said controller executes a learning control for setting the differential pressure learning value at a differential pressure, which pressure is a differential pressure of the lockup clutch under a condition that the slight slip is continued for the predetermined time period during the coast lockup state only when an engine rotation speed is smaller than a predetermined value indicative of a low rotation speed range and when a vehicle speed is smaller than or equal to a predetermined vehicle speed indicative of a low vehicle speed, said controller setting the engagement differential pressure at the sum of the updated differential pressure learning value and an offset differential value after the execution of the learning control.

7. The lockup control system as claimed in claim 1, wherein said controller has previously stored a map for deciding the differential pressure correction value according to a vehicle speed and an engine rotation speed at a time just before decreasing the engagement differential pressure starts.

8. The lockup control system as claimed in claim 1, further comprising sensors for detecting and outputting information indicative of an operating condition of the automatic transmission, said controller being connected to said sensors and deciding whether decreasing the engagement differential pressure and increasing the engagement differential pressure are to be executed or not on the basis of the information from said sensors.

9. The lockup control system as claimed in claim 8, wherein said controller deciding whether obtaining the predetermined differential pressure is to be executed or not on the basis of the information from said sensors.

10. The lockup control system as claimed in claim 8, wherein said sensors comprises a throttle opening sensor which detects a throttle opening of the engine, a vehicle speed sensor which detects a vehicle speed, a impeller rotation speed sensor which detects a rotation speed corresponding to an engine rotation speed, a turbine rotation speed sensor which detects a rotation speed of a turbine runner of the torque converter, a source voltage sensor which detects a source voltage and an oil temperature sensor which detects a working oil temperature of the automatic transmission.

11. A lockup control system of an automatic transmission, the automatic transmission for an automotive vehicle including a torque converter connected to an internal combustion engine, said lockup control system comprising:

transmission operating condition detecting means for detecting an operating condition of the automatic transmission;

lockup means for putting the torque converter selectively into one of an engaged state and a disengaged state according to a duty signal; and a controller connected to said transmission operating condition detecting means and said lockup means, said controller being configured to decide the duty signal so as to set an engagement differential pressure of the lockup clutch at a predetermined decreased differential pressure for a predetermined time period under a coast lockup caused by releasing an acceleration pedal of the engine and to output the duty signal to said lockup means, to decide the duty signal so as to gradually increase the engagement differential pressure at a preset rate after the predetermined time period elapsed and to output the duty signal to said lockup means, and to obtain the predetermined differential pressure by adding a differential pressure correction value to a differential pressure learning value by which the torque converter generates a predetermined amount of slip under the coast lockup.

12. The lockup control system as claimed in claim 11, wherein said lockup means comprises a lockup solenoid which receives the duty signal from said controller and outputs a signal pressure, a lockup control valve which receives the signal pressure and controls the engagement differential pressure according to the signal pressure, and a lockup clutch which receives the engagement differential pressure and puts the torque converter selectively into one of a lockup state and a converter state according to the engagement differential pressure.

13. A control method of an automatic transmission for an automotive vehicle, the automatic transmission employing a torque converter with a lockup clutch and being connected to an internal combustion engine through the torque converter, the control method comprising:

decreasing an engagement differential pressure of the lockup clutch at a predetermined differential pressure for a predetermined time period under a coast lockup, which is caused by releasing an acceleration pedal of the engine in a lockup condition;

gradually increasing the engagement differential pressure at a preset rate after the predetermined time period elapsed; and obtaining the predetermined differential pressure by adding a differential pressure correction value to a differential pressure learning value by which the torque converter generates a predetermined amount of slip under the coast lockup.

\* \* \* \* \*